(12) United States Patent
Patel

(10) Patent No.: US 9,979,190 B2
(45) Date of Patent: May 22, 2018

(54) SYSTEM AND METHOD FOR ENERGY SHEDDING

(71) Applicant: PHILIPS LIGHTING HOLDING B.V., Eindhoven (NL)

(72) Inventor: Maulin Dahyabhai Patel, Tuckahoe, NY (US)

(73) Assignee: PHILIPS LIGHTING HOLDING B.V., Eindhioven (NL)

( * ) Notice: Subject to any disclaimer, the term of this patent is extended or adjusted under 35 U.S.C. 154(b) by 277 days.

(21) Appl. No.: 14/775,011

(22) PCT Filed: Mar. 3, 2014

(86) PCT No.: PCT/IB2014/059402
§ 371 (c)(1),
(2) Date: Sep. 11, 2015

(87) PCT Pub. No.: WO2014/140990
PCT Pub. Date: Sep. 18, 2014

(65) Prior Publication Data
US 2016/0043547 A1 Feb. 11, 2016

Related U.S. Application Data

(60) Provisional application No. 61/778,541, filed on Mar. 13, 2013, provisional application No. 61/807,161, filed on Apr. 1, 2013.

(51) Int. Cl.
*H02J 1/14* (2006.01)
*H02J 3/14* (2006.01)
(Continued)

(52) U.S. Cl.
CPC ............ *H02J 1/14* (2013.01); *H02J 3/005* (2013.01); *H02J 3/14* (2013.01); *H02J 3/32* (2013.01);
(Continued)

(58) Field of Classification Search
CPC ........ H02J 3/14; H02J 1/14; H02J 3/16; H02J 7/025; H02J 3/38; H02J 3/48; H02J 7/35; H02J 3/46
(Continued)

(56) References Cited

U.S. PATENT DOCUMENTS

2002/0140400 A1   10/2002   Hatori
2004/0263122 A1   12/2004   Morisawa
(Continued)

FOREIGN PATENT DOCUMENTS

CN   102782607 A   11/2012
EP   1426851 A2   6/2004
(Continued)

OTHER PUBLICATIONS

Valoen, Lars Ole et al "The Effect of Phev and Hey Duty Cycles on Battery and Battery Pack Performance", PHEV 2007.
(Continued)

*Primary Examiner* — John Poos

(57) ABSTRACT

This invention discloses a method and apparatus for managing energy shedding by utilizing built-in energy storage capacity of electronic devices to realize load shedding by selecting disconnecting the devices from the electrical grid and operating on battery power and detecting appropriate periods to reconnect the devices to the grid to replenish the expended energy in the energy storage capacity.

13 Claims, 6 Drawing Sheets

(51) Int. Cl.
*H02J 3/00* (2006.01)
*H02J 9/06* (2006.01)
*H02J 3/32* (2006.01)
*G06F 1/26* (2006.01)

(52) U.S. Cl.
CPC ................ *H02J 9/06* (2013.01); *H02J 9/062* (2013.01); *G06F 1/263* (2013.01)

(58) Field of Classification Search
USPC ........................................ 307/19, 20, 21, 22
See application file for complete search history.

(56) References Cited

U.S. PATENT DOCUMENTS

2007/0278860 A1* 12/2007 Krieger ................... H02J 9/061
                                                              307/64
2011/0140667 A1   6/2011 Moon
2012/0043889 A1   2/2012 Recker
2012/0065801 A1   3/2012 Rossi
2012/0206108 A1   8/2012 Waring

FOREIGN PATENT DOCUMENTS

| JP | 6277825 A | 4/1987 |
| JP | 2002252924 A | 9/2002 |
| JP | 2002271992 A | 9/2002 |
| JP | 2002345177 A | 11/2002 |
| JP | 2004185050 A | 7/2004 |
| JP | 2004234540 A | 8/2004 |
| JP | 2005025382 A | 1/2005 |
| WO | 2012093324 A1 | 7/2012 |
| WO | 2013182927 A2 | 12/2013 |

OTHER PUBLICATIONS

Roth, Kurt W. et al "Energy Consumption by Office and Telecommuications Equipment in Commercial Buildings", vol. 1, Energy Consumption Baseline, Jan. 2002.

* cited by examiner

SYSTEM AND METHOD FOR ENERGY SHEDDING

CROSS-REFERENCE TO PRIOR APPLICATIONS

This application is the U.S. National Phase application under 35 U.S.C. § 371 of International Application No. PCT/IB2014/059402, filed on Mar. 3, 2014, which claims the benefit of U.S. Provisional Patent Application No. 61/778,541 filed on Mar. 13, 2013 and U.S. Provisional Patent Application No. 61/807,161 filed on Apr. 1, 2013. These applications are hereby incorporated by reference herein.

This application is related to the field of energy management and more particularly to a system and method for managing electrical energy shedding.

Lights, HVAC units, computers, cell phone, TV, radio and other electricity consuming devices are integral parts of our lives. Demand for electricity, which is typically supplied by utility companies through a power grid, varies from time to time. To prevent sudden surges in power demand from overwhelming the utility infrastructure and resources, the load on the electrical grid is monitored and controlled. The term load shedding refers to the process of reducing the load on the electrical grid in response to increased demand and/or decreased supply.

Generally, utility companies have built, and continue to expand, the electrical infrastructure (grid) to meet peak demands, which incurs higher capital expenditure. Furthermore, the cost of generating additional power on a short notice is significantly higher because the short term generation of electrical power employs expensive technologies. Thus, to reduce peak demand utility companies encourage their customers to cut back on peak demand by charging them more in proportion to their demand.

Demand is defined as the average rate at which electricity is consumed during a time interval (e.g., 15 or 30-minute intervals). Demand is measured in kilowatts (kWs). The maximum actual demand for all intervals in a time interval (i.e., a month or past 12 months) is called the peak demand. Utility distribution companies charge commercial customers in proportion to their peak demand. Customers have financial incentives to actively manage their demand and shed unnecessary load to prevent demand spikes and avoid higher costs.

In addition to peak demand based-charges, customers are also charged based on actual usage of electricity measured in kilowatt hours (kWHrs). The rates of electricity vary by time-of-day and season. Typically, utility companies charge higher tariffs during on-peak periods or durations and lower tariffs during off-peak periods or durations.

Commercial entities pay about 1.5 to 2 times for electric power used during on-peak periods compared to the power used during off-peak periods. Price of electricity during Critical Peak Pricing (CPP) events can be as high as 17 times compared to the prices charged during off-peak periods. Hence, shedding the load from the grid during on-peak and CPP periods can significantly reduce the energy costs to a company.

In a typical commercial enterprise a number of batteries equipped electronic devices, such as laptops, servers, PCs, emergency lights, access control systems and the like, utilize a significant amount of electrical energy. For example, computers, display devices and UPSs (Uninterruptible Power Supplies) may account for 40% to 60% of the energy used by office equipment. A typical laptop consumes around 30 Watts and a typical desktop consumes around 100 Watts.

In addition lighting, whether overhead or task, may account for about 37% of the electricity consumed in a commercial building.

Thus, the energy expended from electronic (computers, laptops, etc.) equipment and electrical (lighting) equipment contributes significantly to a consumer's operational costs as these equipment are typically fully operational during high tariff hours (peak periods).

In addition, certain state and local laws have been enacted that allow utility companies to request consumers to reduce their demand in order to prevent overloading the electrical grid. For example, ASHRAE 189.1 requires buildings to have at least 10% peak electric load reduction capability. International Green Construction Code and California's Title 24-2008 mandate demand responsive lighting control systems capable of reducing lighting power consumption by at least 15%.

One strategy for load shedding is to adjust temperature setting on air conditioning units upwards during peak demand periods in order to reduce the demand air conditioning units impose on the electrical grid. Alternatively, air conditioning units may be operated on a designated duty cycle during peak demand periods that prevents continuous running of the unit to reduce the demand the air conditioning units impose on the electrical grid.

Similarly, overhead lighting may be turned off during periods of requested reduced demand.

However, the remaining electronic and electrical equipment that are active during these periods still contribute significantly to the energy consumption and the costs to the company.

Hence, there is a need in the industry for methods and systems for managing the electrical energy consumption of electronic and/or electrical equipment to satisfy mandated demand requirements and to lower operational costs.

It is an object of the present invention to provide methods and systems for managing energy shedding to satisfy demand response requests and to lower operational costs.

It is an object of the present invention to provide for a method and system for managing energy shedding while providing that user comfort and convenience are not compromised.

It is an object of the present invention to provide a method and system for managing energy shedding through smart battery usage and recharging to ensure flexibility and portability are preserved.

Generally, the primary purpose of the battery/UPS (Uninterruptible Power Supply) is to supply power during emergencies and to enable portability. In accordance with the principles of the invention, batteries and UPSs may be used for load shedding for a short duration while preserving sufficient level of charge to satisfy their primary purposes. Accordingly, batteries and/or UPS are utilized for load shedding as long as the battery's or UPS State of Charge (SoC) or capability remains above a reserved charge. Reserve charge represents the amount of battery charge reserved for emergencies and battery driven events.

In accordance with the principles of the invention, a method for managing load shedding in a device capable of operating on an electric grid and an energy storage power source is disclosed. The method, operable in a processor, comprising the steps of: receiving a request for load shedding, determining whether to honor the request for load shedding, determining whether capacity in an energy storage power source is above a reserve level and switching to said energy storage power source for supplying energy when capacity in the energy storage power source is at least at, or above, the reserve level.

In another aspect of the invention, a system for managing load shedding is disclosed. The system comprises a processor in communication with a memory, the memory including code which when accessed by the processor causes the processor to: receive a request for load shedding, determine whether to honor the request for load shedding, determine whether capacity in an energy storage power source is above a reserve level; and switch to the energy storage power source for supplying energy to the processor when capacity in said energy storage power source is above said reserve level.

The advantages, nature, and various additional features of the invention will appear more fully upon consideration of the illustrative embodiments to be described in detail in connection with accompanying drawings wherein like reference numerals are used to identify like element throughout the drawings.

It is to be understood that the figures and descriptions of the present invention described herein have been simplified to illustrate the elements that are relevant for a clear understanding of the present invention, while eliminating, for purposes of clarity, many other elements. However, because these eliminated elements are well-known in the art, and because they do not facilitate a better understanding of the present invention, a discussion of such element or the depiction of such elements is not provided herein. The disclosure herein is directed to also variations and modifications known to those skilled in the art.

Figure 1A:
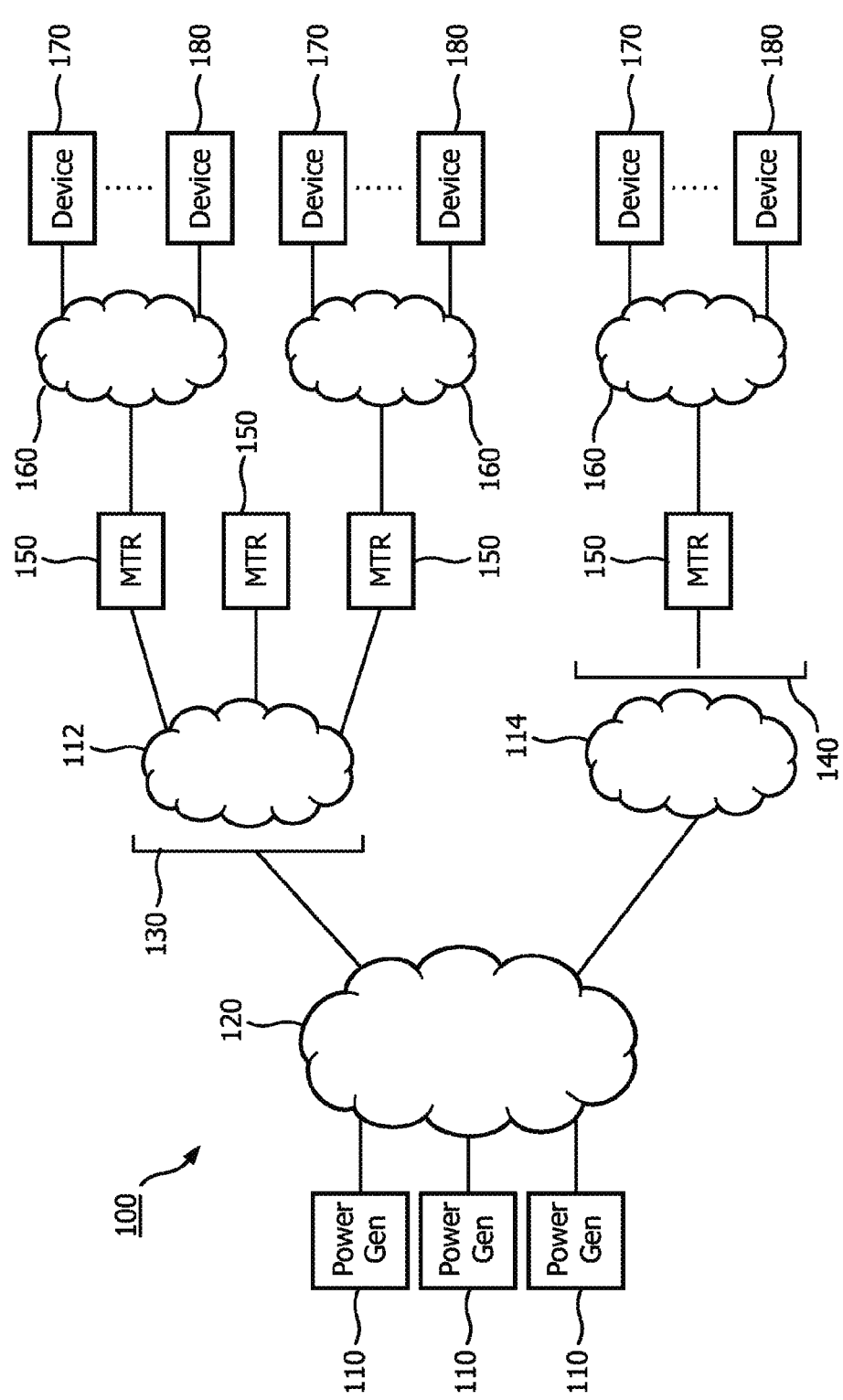
FIG. 1A illustrates a conventional electrical grid network.

FIG. 1A illustrates a convention electrical grid system 100 including a plurality of electrical plant generators 110 (e.g., coal, wind, nuclear, or combination thereof) providing electrical energy to an electrical grid 120. Commercial entities 130 and residential entities 140 are connected to the electrical grid 120, through electrical sub-networks or sub-grids, 112, 114, to obtain supplied electrical energy to power devices within the corresponding entity. The supplied electrical energy is monitored and accounted for by electrical meters 150. Within each entity 130, 140 exists an electrical network 160 which includes a plurality of connections, receptacles and/or outlets (not shown) to which one or more electrical devices 170 (e.g., lights, appliances, etc.) and electronic devices 180 (e.g., computers, laptops, computer monitors, UPSs, servers, etc.) may be connected.

Figure 1B:
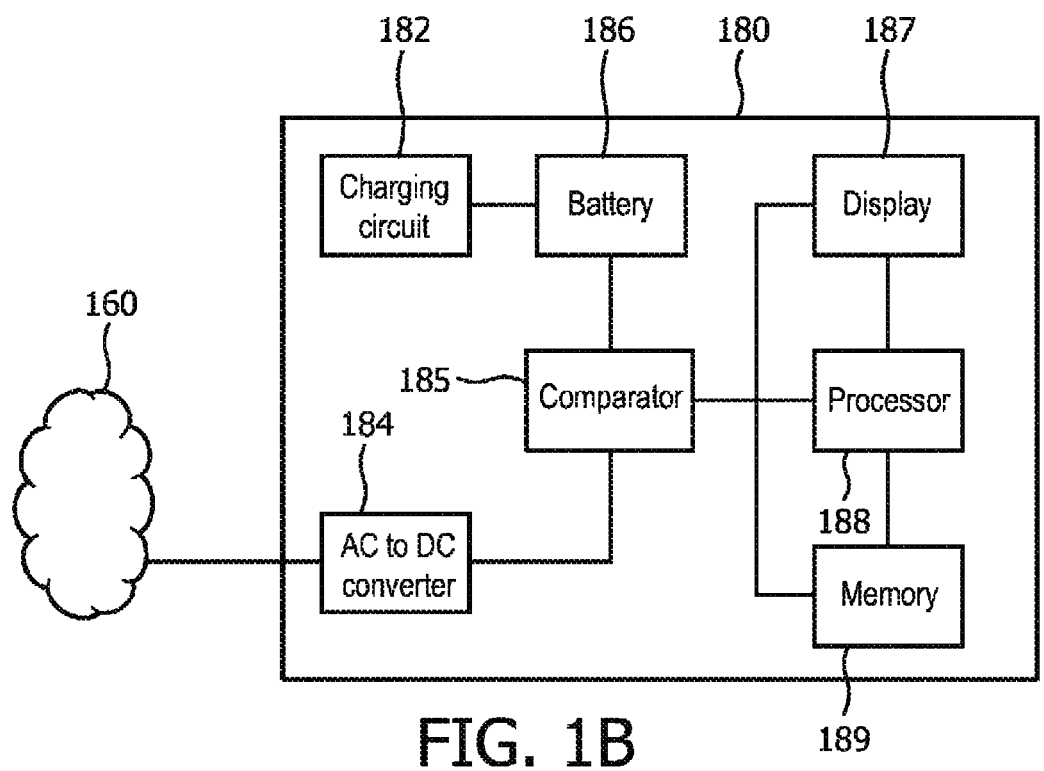
FIG. 1B illustrates a conventional electronic device configuration.

Referring to FIG. 1B, typically each of the electronic devices 180 includes a battery or storage device (i.e., an electric energy power supply) 186 that provides electrical energy to the processing elements of the device when the device is disconnected from the grid 160. For example, a laptop computer may include a battery (or energy storage device) 186 that stores electrical energy provided by grid 160 and releases electrical energy to the processing elements 187, 188 189 of the electronic device (e.g., laptop computer) 180 when electrical energy is not provided to the electronic device 180 by grid 160. The processing elements of electronic device may comprise a display 187, a memory 189 which are connected to a processor 188.

Also illustrated, are AC to DC converter 184 that converts the alternate voltage provided by grid 160 to a substantially steady voltage (or direct current) to be used by device 180. The voltage associated with the direct current may be provided to a charging circuit 182 that provides an electrical charge to battery 186 to maintain battery 186 at a substantially full charge. Comparator 185 receives the voltage from AC to DC converter 184 and battery 186 and determines which power source is to provide electrical energy to components of device 180 (e.g., display 187, processor 188 and memory 189).

Although, FIG. 1B illustrates a comparator 185 determining whether voltage from battery 186 or AC to DC converter 184 is to be applied to processor 188, for example, if would be appreciated that the comparator 185 is merely a logical representation of a device may determine a larger to two input voltages and apply the larger of the two input voltages to processor 188. Alternatively, comparator 185 may be represented by a sampling circuit (not shown) that periodically samples the DC output voltages of battery 186 (i.e., an electrical storage power source) and AC to DC converter 184. The results of the sampling circuit may then be applied to the comparator 185 that applies the larger of the two DC output voltages to the processor 188. In a further alternative embodiment, an output of the comparator may be applied to a switch (not shown) that applies the larger voltage of the storage device 186 and the AC-to-CD converter to the processor 188.

Rechargeable lithium ion batteries are one of the most popular types of battery for portable electronics, with one of the best energy-to-weight ratios, no memory effect, and a slow loss of charge when not in use. Although, lithium ion batteries are discussed as an example of energy storage devices, herein, other types of energy storage devices (e.g., Nickel Cadmium, Nickel Metal Hydride) are also considered within the scope of the invention.

Figure 2:
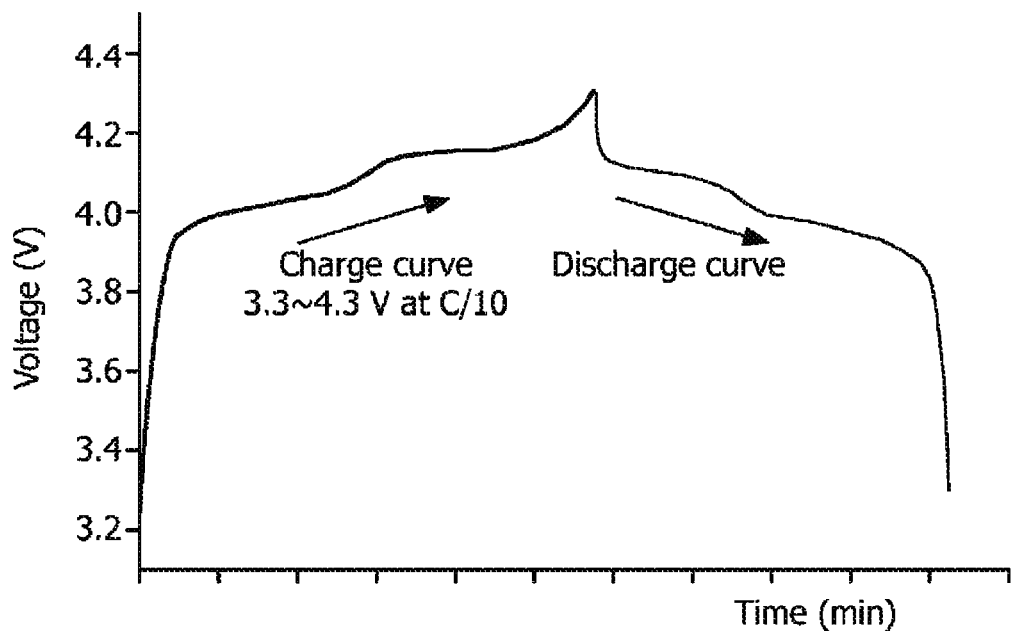
FIG. 2 illustrates an exemplary charge/discharge curve.

FIG. 2 illustrates an exemplary charge and discharge characteristics of a lithium-ion battery, typically found in consumer electronic devices. In this exemplary example, when electrical energy is provided to the battery, the voltage level of the battery increases quickly then increases at a substantially linear rate until a peak voltage is achieved. During a discharge phase, the voltage initially decreases quickly from the peak voltage and then decreases substantially linearly until a minimum voltage is reached. The voltage decreases quickly thereafter.

Utilizing the exemplary charge and discharge characteristics shown in FIG. 2, a method for managing electrical demand through utilization of the battery capability of electronic devices is presented herein.

Figure 3:
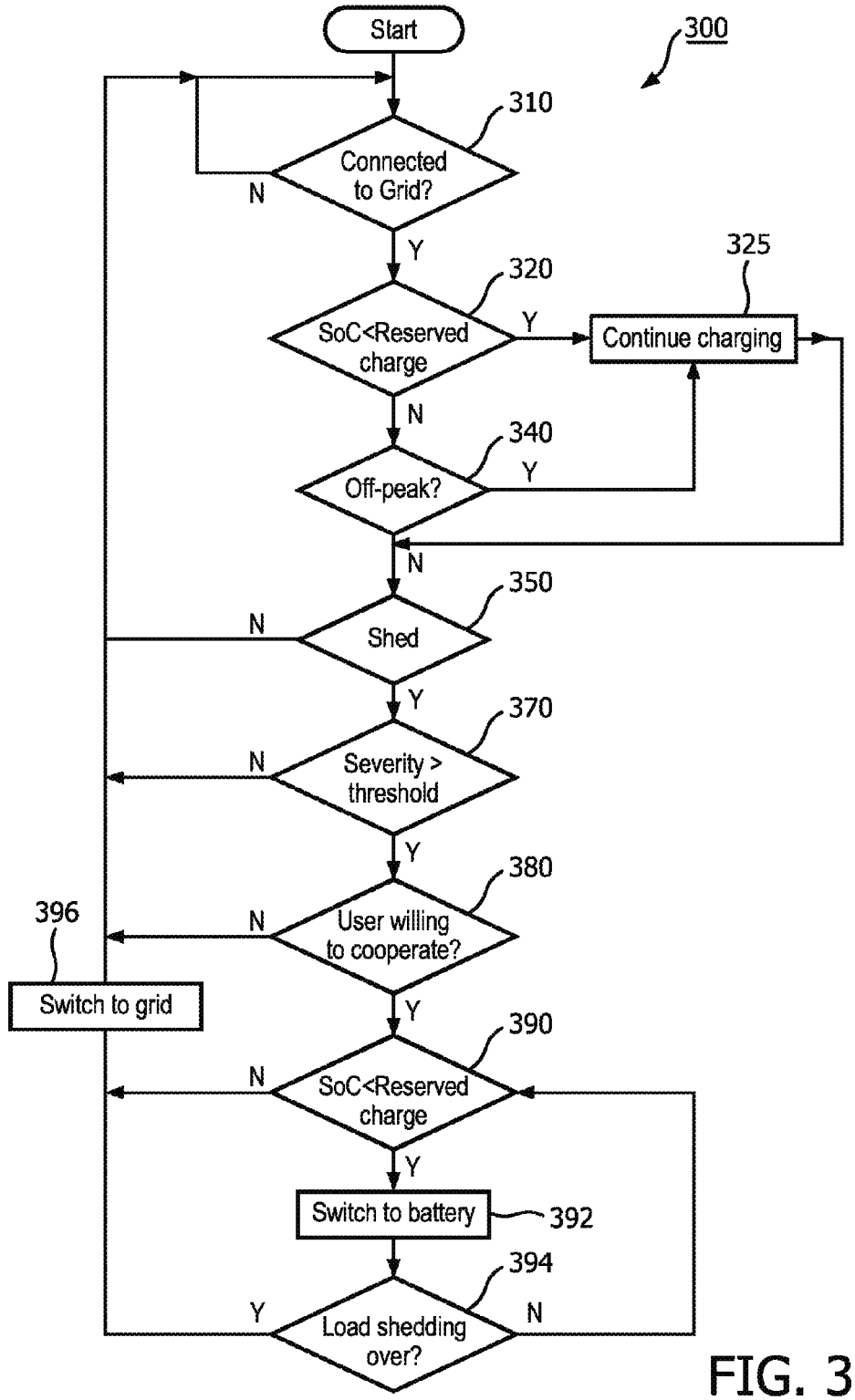
FIG. 3 illustrates a flow chart of an exemplary process in accordance with the principles of the invention.

FIG. 3 illustrates a flow chart of an exemplary process 300 for managing electrical demand and shedding in accordance with the principles of the invention.

At step 310 a determination is made whether a device is connected to the electrical grid (e.g., 160). If the answer is negative, then processing continues to monitor the grid connection. However, if it is determined that the device is connected to the grid, then a determination is made at step 320 whether a battery associated with the device has a State of Charge (SoC) or capacity less than a reserve charge. In this case, the reserve charge represents that level of charge reserved for emergencies and battery driven events. A reserve charge for a battery driven event may represent that charge that allows the battery to provide sufficient energy for the device to perform an appropriate action (e.g., hibernation or sleep mode or an orderly shutdown) before the battery lacks sufficient energy capacity to perform such appropriate action. As would be expected the reserve charge level may be set based on the type of device connected to the battery, the amount of energy consumed by the device and the type of battery. Hence, the reserve level may be determined dynamically for individual devices.

If the state of charge is less than the reserve charge, then processing continues to step 325, where charging of the battery continues by storing energy from the grid into the battery as described previously. Processing then continues to step 350.

However, if the state of charge is not less than the reserve charge, then a determination is made at step 340 whether the electrical grid is operating within an off-peak period. Peak and off-peak periods are those time periods of high electricity and low electricity costs, respectively, and are known as being periods where costs are higher in the peak period and lower in the off-peak period. The hours of peak-periods and off-peak periods may be seasonally determined or may be based, for example, on temperature ranges.

If it is determined that the device is connected to the grid during an off-peak period, then processing continues to step 325 to continue charging the battery. Processing then continues to step 350.

However, if it is determined that the period is not an off-peak period, then processing continues to step 350 to await a shedding signal. The shedding signal may be generated by the power generation source (generator 110, FIG. 1) or by a facility manager associated with the grid (e.g., 160, FIG. 1) to which the device is connected or may be generated by the device user or may be generated under software control based on preprogrammed conditions.

When the shedding signal is received, a determination is made at block 370, whether the severity of the situation that generated the shedding signal is greater than a threshold value. For example, the shedding signal may have been generated by a utility that has experienced an excessive demand for electrical energy and must reduce the requested demand to prevent damage to the generation equipment.

If the severity is not greater than a threshold value, then processing continues at step 310. Otherwise a determination is made, at block 380, whether the user is willing to cooperate with the load shedding request. Willingness of the user may be performed manually (i.e., user interaction) or automatically (i.e., through a user profile or satisfaction of one or more preset conditions). The user profile may be set by either a facility manager or the device or equipment user.

If the user is unwilling to cooperate with energy shedding, then processing continues at block 310. Otherwise, a determination is made at block 390, whether the battery state of charge is greater than the reserve charge. If the state of charge is not greater than the reserve charge, the processing continues at block 396 and the device is switched to, or remains on, the grid power source. In this case, the battery is maintained at at least the reserve voltage, while the device operates on energy received from the grid.

Otherwise, at block 392, the device is disconnected from the grid power source and operates on the electrical energy provided by an energy storage power source represented by an energy storage device (e.g., a battery).

At block 394, a determination is made whether load shedding is over. In this case, load shedding may be determined to be over if a command to end load shedding is received or if a time indicates that an off-peak period has been entered. If shedding is not indicated to be over then processing returns to step 390 to monitor the status of the battery. However, if shedding is indicated to be over, then processing continues to step 396, where the device is switched to receive electrical energy from the electrical grid. Control then returns to step 310.

Figure 4:
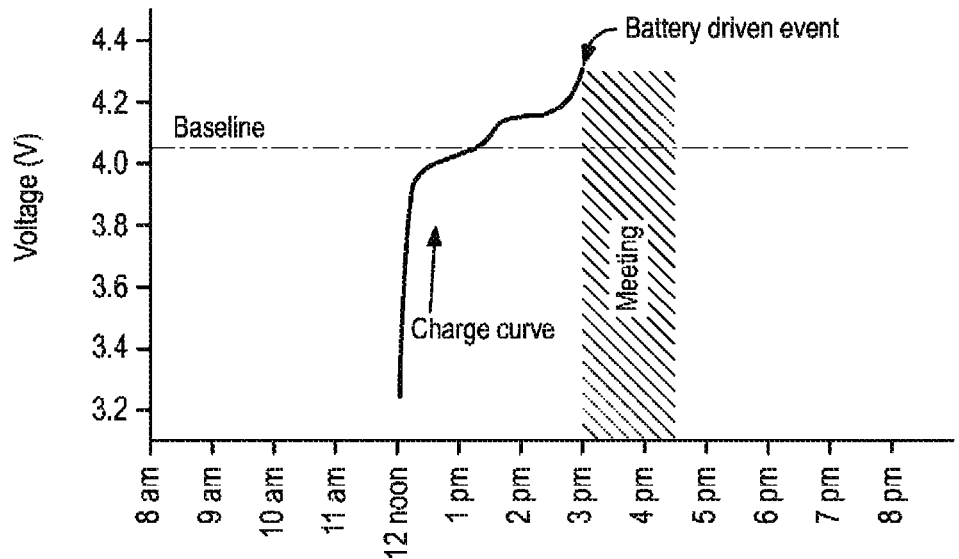
FIG. 4 illustrates a graph of the utilization of an exemplary battery charge curve in accordance with the principles of the invention.

FIG. 4 illustrates an example of energy management is accordance with the principles of the invention. In this example, when the invention obtains knowledge that a user is scheduled for a meeting at 3 pm and that the user will require a full battery charge, as connection to an electrical grid may not be possible, then the system, based on an exemplary charging curve shown in FIG. 2, begins charging the battery at a time sufficiently in advance (e.g., 12 noon) so that the battery reaches full charge by the time the meeting starts. In this case, knowledge of the scheduled meeting may be determined from the user's calendar, for example. Additionally, the user may provide a manual input as to the user's upcoming schedule or the user may establish a profile as to when energy shedding is allowed and when full charge is necessary.

For example, a user may enroll in a load shedding program and configure their preferences (i.e., user preferences or profile) that establish conditions (when and how) under which control of their computer's battery is used to provide primary power in order to shed load from the grid. Users can also set alerts when their electronic devices (e.g., computers) switch to battery power and/or use battery power for task lighting in response to load shedding signal(s).

A user may manually intervene to dismiss the load shedding signal and continue drawing power from grid to preserve battery charge in anticipation of upcoming battery driven events.

In one aspect of the invention, users may specify weekly schedule (i.e., a user profile) based on parameters such as: Business days per week; Business hours per day; Lunch break hours; Load shedding exclusion days per week; Load shedding exclusion hours per day; Baseline battery charge level; Time and durations of battery driven events; and Whether the battery can be used for task lighting during demand response event.

In another aspect of the invention, a user's calendar (e.g. MICROSOFT OUTLOOK, Microsoft and Outlook are registered Trademarks of the Microsoft Corporation, Redmond Wash., USA) may be used to anticipate when a user will need a charged battery. For example, if a user has accepted a meeting invitation which is in a room other than user's office then may be considered a battery driven event which warrants a charged battery. It is desirable to have the computer's (or laptop's) battery sufficiently charged before an upcoming meeting. Similar battery driven events can be programmed based on user's schedule.

Figure 5:
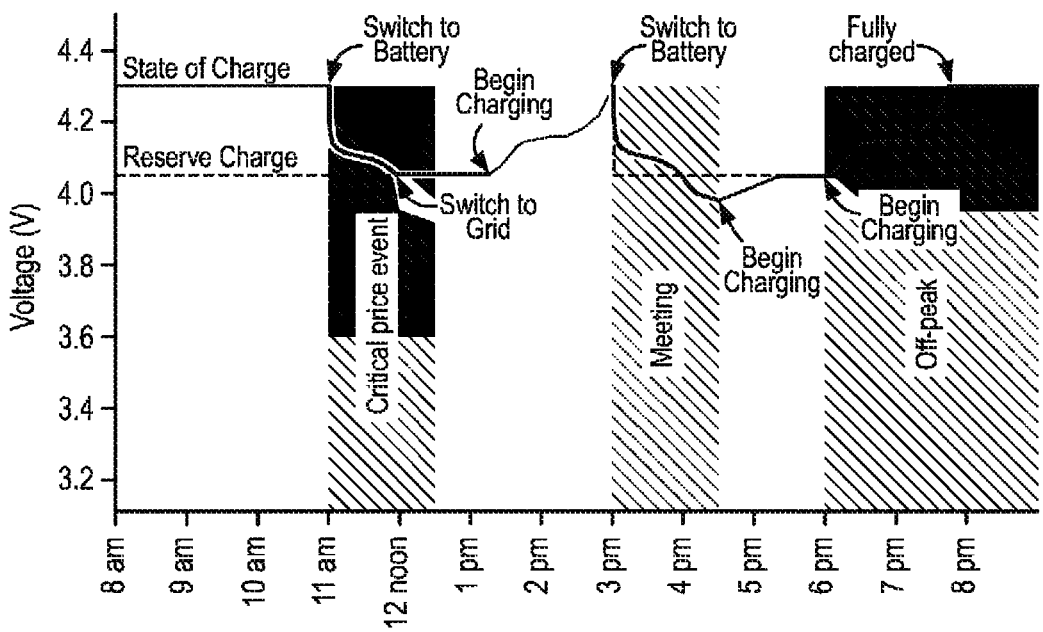
FIG. 5 illustrates a graph of energy shedding management in accordance with an exemplary embodiment of the invention.

FIG. 5 illustrates an example of the operation of the invention in energy management in accordance with the principles in the invention. In this example, at 8:00 am, the battery associated with a device is fully charged at an exemplary value of 4.3 volts. The reserve charge is shown at a level of 4.05 volts. At 11:00 am, a critical pricing period begins, which lasts for one and a half hour (until 12:30). In this case, the device receives a notification of a critical pricing event. The notification may be received from a command issued over a network (IP or other network) (not shown). In response to the critical pricing event notification, the device decouples from the grid power source and switches to a battery power source. In addition, during this critical pricing period, the overhead lighting may be reduced or turned off the task light may be switched to a battery supplied power (e.g., a UPS).

During the period that device is coupled to the battery source, the voltage level of the battery decreases, in accordance with the exemplary discharge curve shown in FIG. 2, to the reserve level at 12 noon. At this point, in order to maintain the battery's emergency capability, the devices decouples from the battery source and switches back to the grid power source, if the grid power source is available. In this case, as the device is receiving power or energy from the grid and the battery level is at the reserve level, in accordance the principle of the invention, the battery does not receive energy to charge the battery to the full charge, as is conventional performed. That is, in accordance with the principles of the invention, the battery remains at the reserve charge level during the period of critical pricing period in order to avoid drawing energy from the grid to replenish the battery to full charge (12:00 to 12:30). In addition, from 12:30 to 1:30 (a period of one hour), no energy is consumed to recharge the battery as the smart charging in accordance with the principles of the invention draws only sufficient energy during this period to operate the device without drawing additional electrical energy from the grid to charge the battery. Hence, additional energy savings are achieved by maintaining the battery at a reserve level while receiving energy from the grid.

In accordance with the principles of the invention, the battery will remain at the reserve charge until an off-peak period in entered (6 pm).

However, as is further illustrated and in accordance with the principles of the invention, based on the user's scheduled meeting at 3 pm, the battery begins charging at 1:30, (or a predetermined time period before the scheduled time) in order to provide a fully charged battery by the meeting time.

Based on the example charging curve shown in FIG. 2, and a desire to have a fully charged battery at a desired time (e.g., 3:00 pm), the smart charging in accordance with the principles of the invention begins at a time sufficiently in advance of the desired time to provide a full charge.

In this illustrated example, the predetermined time to begin battery charging is outside the critical pricing period, thus, charging of the battery begins at a time sufficiently prior to the scheduled meeting to provide a full battery charge at the desired time. Although, not shown it would be recognized that battery charging may also occur during the critical pricing period if charging is required at a time sufficiently ahead of a desired time to achieve a full charge at the desired time.

Assuming that the device is physically disconnected from the grid power source at the desired time and is operating on the power stored in the battery, then the voltage output of the battery decreases in accordance with a typical discharge curve shown in FIG. 2.

In this case, the battery continues to discharge as the device is used during the meeting. As illustrated, because the device is decoupled from the grid and the capacity in the battery decreases, when the reserve level is reached, it is not possible to return to the gird power source and, hence, the battery voltage continues to decrease below the reserve level. At this point, warning messages may be provided to the user that the battery voltage level has reached the reserve level and that a limited amount of time for continued operation is available.

In this case, when the meeting is ended (i.e., 4:30) and it is possible to return the device to a grid power source, charging of the battery begins so that the battery may be charged to a minimum level (i.e., the reserve level). As cost of electricity is generally higher during on-peak period, which in this illustrated case lasts until 6:00 pm, it is cost-effective to maintain the battery at the reserve level between 4:30 and 6:00 pm and charge the battery after 6:00 pm when the cost of electricity will be reduced (off-peak period). Therefore, the battery is charged up to a reserved capacity from 4 to 4:30 and then from the reserved capacity to full capacity from 6 to 8 pm.

Figure 6:
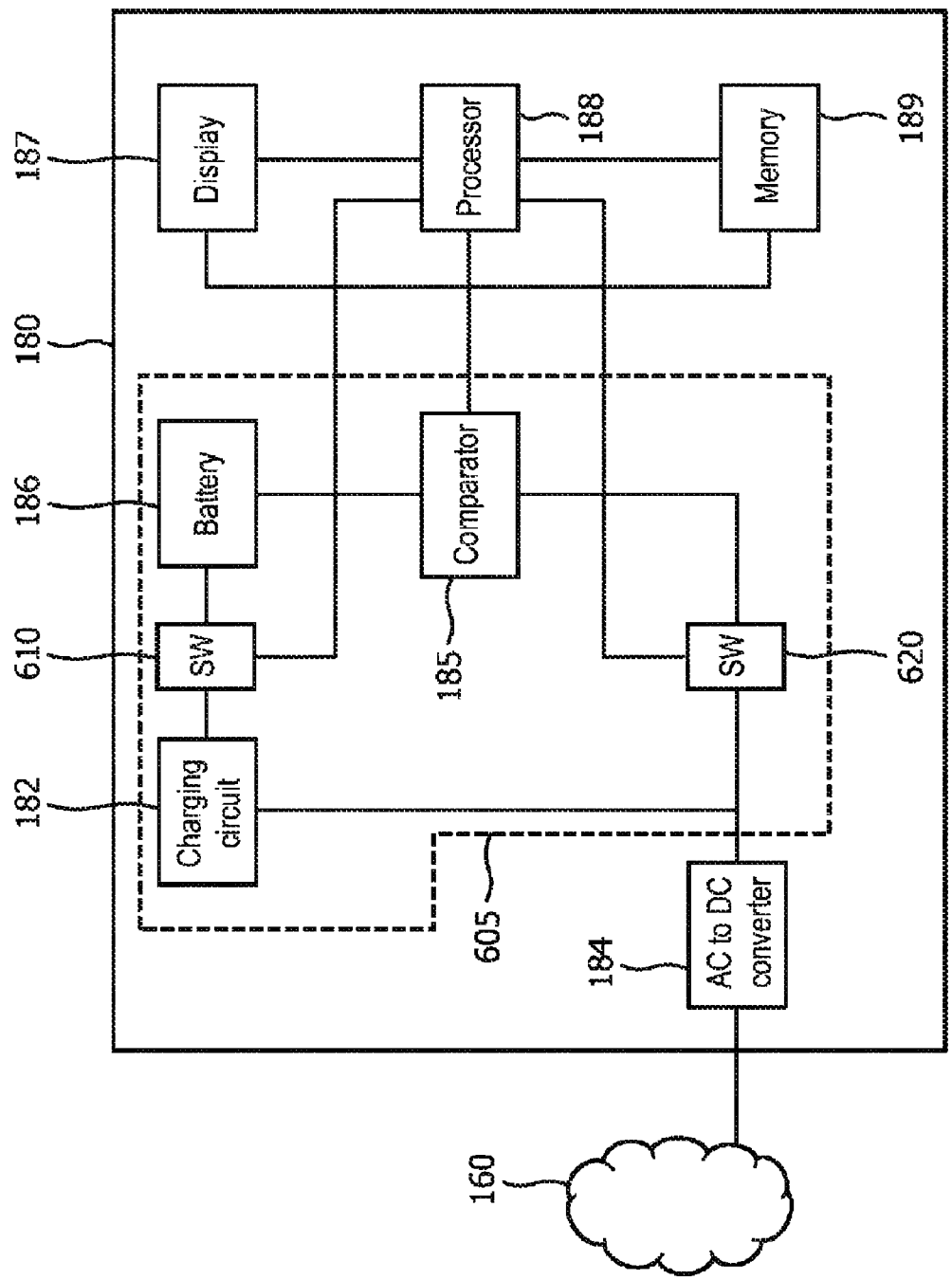
FIG. 6 illustrates an exemplary device configuration in accordance with the principles of the invention.

FIG. 6 illustrates an exemplary embodiment of a device in accordance with the principles of the invention. In this illustrated embodiment, which is similar to that described with regard to FIG. 1B, device 605 incorporates charging circuit 182, first switch 610 and battery (energy storage device) 186 and second switch 620 that isolates comparator 185 from the DC voltage source. An AC to DC converter 184, which represents a DC voltage source converts voltages associated with an inputted alternating current (AC) to a voltage associated with a direct current (DC). The DC voltage is applied to a charging circuit 182, to charge battery 186, and to comparator 185. Comparator 185 determines which of the voltage from battery 186 and DC voltage source 184 is applied to display 187, processor 188 and memory 189, as previously discussed.

Also, illustrated is switch 610 between charging circuit 182 and battery 186. Switch 610 is used to connect or disconnect charging circuit 182 from battery 186. Switch 610 may be controlled by a signal generated by processor 188. Or switch 610 may be controlled by a dedicated circuit (not shown) that determines whether battery 186 is above or below a reserve level.

In one aspect of the invention, switch 610 may be connected to battery 186 when charging is required. For example, periods 1:300 to 3 pm, 4:30 to 5:30 pm and 6 to 8 pm, FIG. 5 illustrate period where charging is required. Alternatively, switch 610 may be disconnected from batter 186 when charging is not desired. For example, periods 11 am to 12 noon, 12:30 to 1:30 pm and 5:30 to 6 pm, FIG. 5 illustrate periods where charging is not performed.

Also illustrated is switch 620 between the AC to DC converter 184 and comparator 185. Switch 620 may be used to isolate the elements of device 180 (i.e., processor 188, memory 189 and display 187) from the electrical supply provided through grid 160. Hence, while device 180 may be physically connected to grid 160, switch 620 may provide logical connecting/disconnection of device 180 from the grid. Hence, in the discussion herein, the term "disconnected from the gird" may be considered the physical disconnect from grid 160, (i.e., removing a connection to AC to DC converter 184) or a logical disconnection from grid 160 (i.e., positioning switch 160 to prevent the output of AC to DC converter from being connected to comparator 185).

Switch 620 may receive, as an input, a control signal from processor 188 to position the switch in one position to connect the AC to DC converter to the comparator 185 or disconnect the AC to DC converter 184 from the comparator 185.

Referring to FIG. 5, switch 620 may be switched so that the device 180 is (logically) disconnected from grid 160 at time 11 am and then switched to connect device 180 to grid 160 at time 12 noon. In addition, as the device 180 is physically disconnected from the grid 160 at time 3 pm, the position of switch 620 may remain in its last state.

Figure 7:
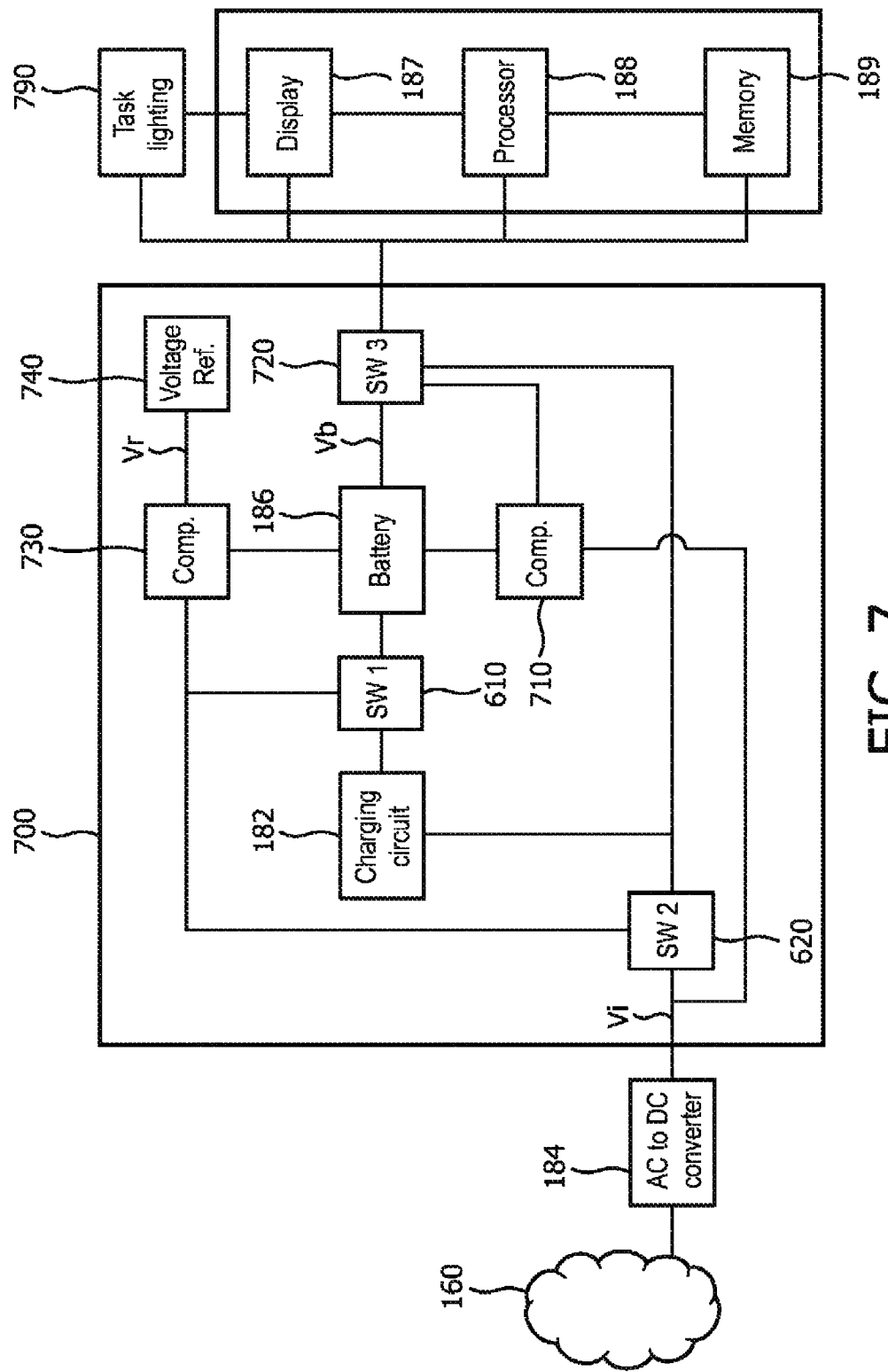
FIG. 7 illustrates a second exemplary device configuration in accordance with the principles of the invention.

FIG. 7 illustrates an exemplary circuit in accordance with the principles of the invention that may operate as a stand-alone device 700 that is adapted to determine whether a voltage from an energy storage power source (i.e., battery 186) or a grid-based DC power source (i.e., AC to DC converter 184) is provided to the elements of a processing system (e.g., processor 188, memory 189, display 187, communication cards (not shown), etc.). Alternatively, the output of device 700 may be provided to a task lighting 790.

Grid 160 supplies an alternating current to an AC-to-DC convertor 184. The AC-to-DC converter 184 provides a DC voltage of a known amplitude, Vi, to device 700. Device 700 includes a switch (SW2) 620, which receives an inputted DC voltage received from AC-to-DC converter 184. Also illustrated are charging circuit 182, switch (SW1) 610, and battery 186, as previously described. Battery 186 produces a voltage referred to as Vb. AC-to-DC converter 184, switch 620, charging circuit 182, switch 610 and battery 186 are comparable to those described with regard to FIG. 6 and, hence, a further description of these elements is not presented with regard to FIG. 7.

Also illustrated are comparator 730, receiving battery voltage, Vb, and a reference voltage, Vr, generated by voltage reference 720. Reference voltage Vr may be equivalent to the reserve voltage previously discussed. In addition, the reference voltage Vr may be determined using a zener diode circuit, as is known in the art.

The output of the comparator 730 may then be applied to switches 610 and 620 to control the operation to switches 610 and 620 based on whether the battery voltage, Vb, is greater than or less than the reference voltage, Vr.

Further illustrated is comparator 710, which receives the battery voltage, Vb, and the input voltage, Vi. The output of comparator 710 controls the position of switch 720. Switch 720 isolates input voltage Vi from the output of device 700.

In accordance with the principles of the invention, when the input voltage, Vi, is greater than the battery voltage, Vb, which is greater than the reference voltage, Vr, then switches 610, 620 and 720 are opened to allow battery voltage, Vb to be supplied to processor 188, for example. Addition, when the input voltage, Vi, is greater than the battery voltage, Vb, which is less than the reference voltage, Vr, then switches 610, 620 and 720 are closed so that the grid supplied voltage Vi is provided to processor 188. In another aspect, when input voltage, Vi, is less than the battery voltage, Vb, which is greater than the reference voltage, Vr, then switches 610, 620 and 720 are opened to allow battery voltage, Vb to be supplied to processor 188. Similarly, when input voltage, Vi, is less than the battery voltage, Vb, which is less than the reference voltage, Vr, then switches 610, 620 and 720 are opened to allow battery voltage, Vb to be supplied to processor 188.

Thus, in accordance with the principles of the invention, device 700 may disconnect a grid based power source from providing energy to the processing unit (i.e., processor 188, memory 189, display 187) when a battery source may adequately provide the necessary voltages.

Although FIG. 7 depicts a device for managing electrically energy provided to a processing system using comparator circuitry, it would be recognized that the decision determining devices (i.e., comparators) may be incorporated into a programmable device, such as an ASIC (Application Specific Integrated Circuit), for example, that may incorporate the decision making logic presented herein.

In addition, although the device shown in FIG. 7 would imply that the switching would be performed when the hard conditions (e.g., Vr greater than Vb) would cause switching when the conditions are satisfied. However, such hard conditions would cause the switching system to operate around the hard conditions points. Hence, it is contemplated that soft conditions may also be incorporated into the invention wherein the soft conditions may allow operation above and/or below the hard conditions points without altering the scope of the invention. For example, a battery voltage Vb may operate within a tolerance of a reference voltage before a switching occurs. As an example, if a reference voltage is 10 volts, for example, a battery voltage, Vb, may drop to 9 volts (i.e., 10 percent) before a switch to a grid voltage occurs (i.e., Vi greater than Vb less than Vr). Hence, it is contemplated that the voltages referred to, herein, are voltage ranges (e.g., plus/minus 10 percent) and not strict voltage values.

Although the invention has been described with regard to electronic devices (e.g., computers, laptops, UPS, cell phones, etc., it would be understood that electrical devices (e.g., lights, task lights) can be powered by UPS/laptop batteries during a peak demand period. Lighting accounts for about 37% of electricity consumed in a commercial building. If overhead lights are turned off and/or dimmed and task lights powered by laptop and/or UPS batteries are turned on during demand response events then a significant load can be shed from the grid. The combined load shedding potential of both strategies can be enormous. In addition, the task lighting may be controlled by a circuit shown in FIG. 7, wherein when the task lighting may be powered by an electrical grid power source or an energy storage power source, the task lighting may be powered by the energy storage power source when the energy storage power source has sufficient energy capacity to power the task lighting.

For example, task lighting may be powered by universal serial bus connections and, hence, when demand reduction is requested, overhead lighting, which is powered by the electrical grid (e.g., 120V, 240V), may be reduced and task lighting may be invoked. The task lighting may be powered by storage devices that are local to the task lighting (i.e., laptop USB ports) or may be remote (UPS).

Hence, the task lights can be powered by the UPS/laptop batteries during the peak demand period (also during CPP events). If overhead lights are turned off/dimmed and task lights powered by laptop/UPS batteries are turned on during demand response events then a significant load can be shed from the grid. LED based task lights can be integrated into docking station or monitors to automatically turn the lights on during demand response events.

For example, returning to FIG. 1, devices 170 may represent task lighting associated with device 180. In accordance with the principles of the invention, during CPP periods, task lighting may be initiated to operate from the storage energy source contained in device 180. Or the task lighting may be operated from dedicated UPSs connected to the grid 160. Thus, during CPP periods overhead lighting may be reduced while the task lighting may be supplied by stored energy in one or more battery sources.

In addition, while the invention has been described with regard to batteries, it would be recognized that any energy storage device may be used as an storage device power source or supply in accordance with the principles of the invention. Thus, the invention can also exploit energy stored in the batteries of Plug-in Hybrid Vehicles parked in parking lots of commercial buildings to shed load from the grid. The building occupant's schedule and settings will be used to determine when and how much their PHV's battery is used for load shedding purposes. Another application area is emergency lighting where lights are equipped with battery.

Many of these emergency lights are not needed in day light areas during daytime. Their batteries can be utilized for load shedding purposes during critical pricing periods (which almost always occurs during daytime) while recharging them before dusk.

By utilizing the battery power to operate electronic equipment during peak-hours or CPP events and charging batteries during off-peak hours organizations can save on their electricity bill and/or meet the code requirements.

The strategies presented herein can be very useful for instantaneous load shedding during short spikes in demand to prevent total demand from exceeding a predefined limit. Devices that participate in the load shedding can switch back to a grid when demand drops to the predefined limit.

Although, the invention has been described with regard to a single device, it is noted that most of battery equipped electronic devices in modern offices are networked and programmable. Since these devices have necessary hardware and communication infrastructure, the invention presented herein can be implemented with minimal hardware and software modification. Furthermore, software can be easily retrofitted in the existing equipment to support the invention claimed.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer(s), or a special processor(s) or in programmable or dedicated hardware(s), such as an ASIC or FPGA. As would be understood in the art, the computer(s), the processor(s), microprocessor controller(s) or the programmable hardware(s) include memory components, e.g., RAM, ROM, Flash, etc. that may store or receive software or computer code that when accessed and executed by the computer(s), processor(s) or hardware(s) implement the processing methods described herein. A computer program may be stored/distributed on a suitable medium, such as an optical storage medium or a solid-state medium supplied together with or as part of other hardware, but may also be distributed in other forms, such as via the Internet or other wired or wireless telecommunication systems. In addition, it would be recognized that when a general purpose computer(s) accesses code for implementing the processing shown herein, the execution of the code transforms the general purpose computer(s) into a special purpose computer(s) for executing the processing shown herein.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

Other variations to the disclosed embodiments can be understood and effected by those skilled in the art in practicing the claimed invention, from a study of the drawings, the disclosure, and the appended claims. The fact that certain measures are recited in mutually different dependent claims does not indicate that a combination of these measured cannot be used to advantage. Any reference signs in the claims should not be construed as limiting the scope.

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for managing load shedding in a device capable of selectively operating on an electric grid and an energy storage power source, said method, operable in a processor within said device, comprising the steps of:
 charging said energy storage power source to at least said reserve level during off-peak energy periods;
 receiving a request for load shedding;
 determining whether a user of the device has enabled cooperation with said request for load shedding;
  if so, determining whether capacity in the energy storage power source is above a reserve level;
  switching to said energy storage power source for supplying energy to selected components of said device when capacity in said energy storage power source is above said reserve level; and
  switching to said electric grid to supply energy to said device when said energy stored in said energy storage power source is below said reserve level.

2. The method of claim 1, wherein determining whether a user of the device has enabled cooperation with said load shedding request comprises one of: manual user interaction, or automatic user interaction, including one of a user profile or schedule.

3. The method of claim 1, further comprising:
initiating charging of said energy storage power source to a full charge capacity prior to a predetermined event.

4. The method of claim 3, wherein said predetermined event is one of: a scheduled event, a user designated event and a timed event.

5. A method for managing load shedding in a device capable of selectively operating on an electric grid and an energy storage power source, said method, operable in a processor within said device, comprising the steps of:
charging said energy storage power source to at least said reserve level during off-peak energy periods;
receiving a request for load shedding;
determining whether a user of the device has enabled cooperation with said request for load shedding;
if so, determining whether capacity in the energy storage power source is above a reserve level;
switching to said energy storage power source for supplying energy to selected components of said device when capacity in said energy storage power source is above said reserve level; and
switching to said electrical grid to supply energy to said device in response to an indication of ending load shedding; and
charging said electrical storage power source to at least said reserved level.

6. The method of claim 5 further comprising:
charging said electrical storage power source to a full charge capacity during predetermined time periods.

7. A system for managing load shedding, said system comprising:
a processor in communication with a memory, the memory including code which when accessed by the processor causes the processor to:
charge an energy storage power source to at least said reserve level during off-peak energy periods;
receive a request for load shedding:
determine whether a user of the device has enabled cooperation with to honor said request for load shedding;
if so, determine whether capacity in an energy storage power source is above a reserve level; and
switch to said energy storage power source for supplying energy to selected components in said system when capacity in said energy storage power source is above said reserve level; and
wherein the processor inhibits charging said energy storage power source during a period indicated to be load shedding when said energy storage power source indicates at least said reserve level.

8. The system of claim 7, the processor determining whether a user of the device has enabled cooperation with said load shedding request comprises one of: manual user interaction, or automatic user interaction, including one of a user profile or schedule.

9. The system of claim 7, the processor further causing:
initiating charging of said energy storage power source to a full charge capacity prior to a predetermined event.

10. The system of claim 9, wherein said predetermined event is one of: a scheduled event, a user designated event and a timed event.

11. A system for managing load shedding, said system comprising:
a processor in communication with a memory, the memory including code which when accessed by the processor causes the processor to:
charge an energy storage power source to at least said reserve level during off-peak energy periods;
receive a request for load shedding:
determine whether a user of the device has enabled cooperation with to honor said request for load shedding;
if so, determine whether capacity in an energy storage power source is above a reserve level; and
switch to said energy storage power source for supplying energy to selected components in said system when capacity in said energy storage power source is above said reserve level; and
switching to said electrical grid to supply energy to said device in response to an indication of ending load shedding; and
charging said electrical storage power source to said reserved level.

12. The system of claim 11, the processor further causing:
charging said electrical storage power source to a full charge capacity during predetermined time periods.

13. The system of claim 12, wherein said predetermined time periods is at least an off-peak time period.

* * * * *